United States Patent Office 3,435,864
Patented Apr. 1, 1969

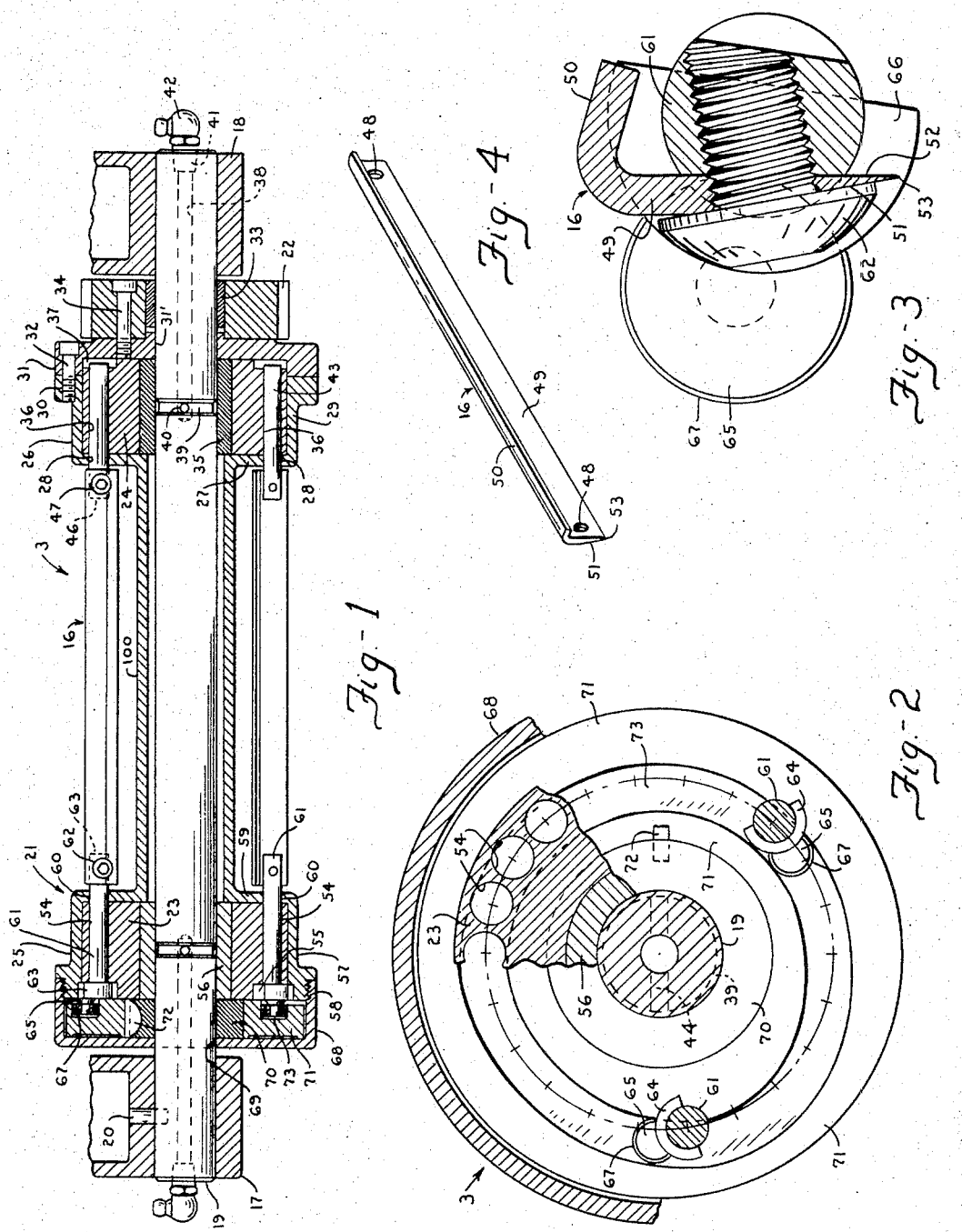

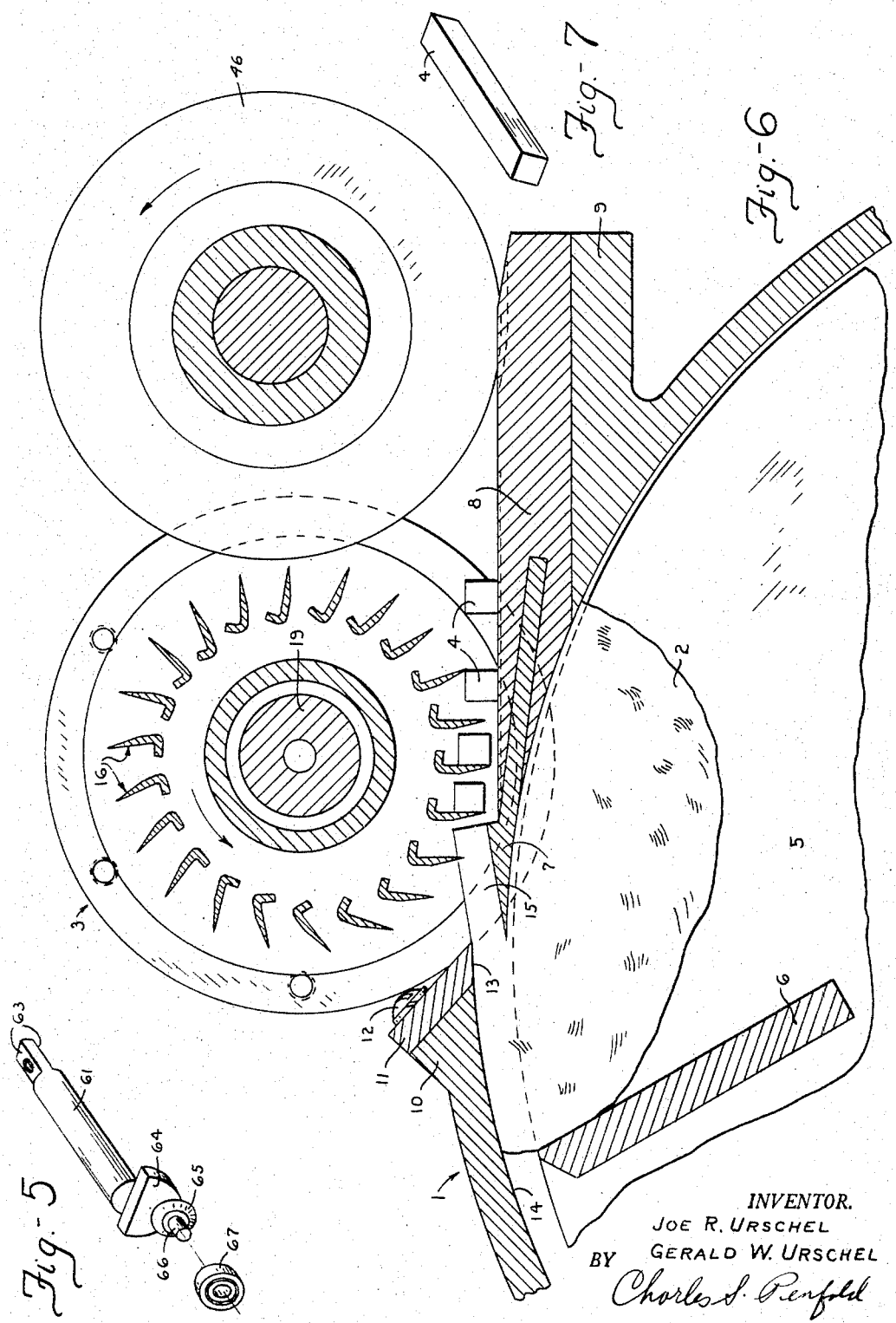

3,435,864
MACHINE STRUCTURE FOR CUTTING A PRODUCT INTO PIECES
Joe R. Urschel, 202 Michigan Ave., and Gerald W. Urschel, 1614 Napoleon, both of Valpraiso, Ind. 46383
Filed Mar. 29, 1966, Ser. No. 538,316
Int. Cl. B26d 1/02, 3/22, 4/34
U.S. Cl. 146—78    8 Claims

ABSTRACT OF THE DISCLOSURE

The invention embodies oscillating a plurality of elongate circumferentially spaced knives about their respective axes and about a common axis.

---

The subject invention relates generally to means for cutting a product into pieces and more particularly is directed to an apparatus or machine structure for slicing a food product into strips.

The structure may be employed wherever applicable but is primarily designed and constructed for dicing or cutting a product, such as potatoes, suitable for making french fries and embodies improvements over the structure disclosed and claimed in our Patents Nos. 2,934,117 and 3,003,530, respectively, dated Apr. 26, 1960 and Oct. 10, 1961.

One important object of the invention is to provide an improved means over the above mentioned patented structures, which comprises a unique setup or organization whereby a plurality of circumferentially spaced axially extending knives may be oscillated about their axes while being rotated about a common axis.

More particularly, an assembly for achieving the above objective may comprise an elongate tubular support provided with bearing blocks at its extremities, circumferentially spaced elements which are journalled in the blocks and carry elongate knives, a stationary shaft about which the tubular support, blocks, elements and knives, as a unit, revolve about the longitudinal axis of the shaft, a cam member fixed on the shaft, and means operatively connecting certain of the elements and cam member in a manner whereby the elements and knives will be caused to oscillate in a predetermined path when the unit is revolved, as distinguished from the patented structures in which the elements and knives rotate about their axes.

An important object of the invention is to provide an improved assembly whereby a greater number of knives of greater strength may be obtained to produce smaller dices or strips, as distinguished from the patented structures.

A significant objective of the invention is to provide an assembly of the character above referred to, including improved means whereby to lubricate internal working components of the structure from a location externally of the assembly.

Other objects and advantages of the invention reside in providing structure which offers advantages with respect to manufacture and assembly, efficiency, relative ease in the replacement of any worn parts, and durability.

Additional objects and attributes of the invention will become readily apparent after the description hereinafter set forth is considered in conjunction with the drawings annexed hereto.

Referring to the drawings:

FIGURE 1 is a horizontal sectional view of a knife assembly embodying the invention;

FIGURE 2 is an enlarged transverse section taken through one extremity of the assembly shown in FIGURE 1 for the purpose of illustrating certain details of the structure;

FIGURE 3 is an enlarged transverse sectional view taken through one of the knives and a supporting element or holder therefor;

FIGURE 4 is a perspective view of one of a plurality of knives utilized in the assembly of FIGUURE 1.

FIGURE 5 is a perspective view of one of a plurality of knife supporting elements or holders;

FIGURE 6 is an enlarged partial vertical section taken through the assembly shown in FIGURE 1 and a cutter assembly associated therewith; and FIGURE 7 is a perspective view of the resultant product obtained through the agency of the structure shown in FIGURE 6.

Referring first and generally to the structure exemplified in FIGURE 6 of the drawing, there is shown an assembly generally designated 1, for cutting a product 2, such as a potato, to form a portion 15 and an assembly generally designated 3 operatively associated with the assembly 1 for cutting the portion 15 into strips or pieces 4 as illustrated in FIGURE 7. An assembly or machine structure similar to that designated 3 is disclosed and claimed in our Patent No. 3,003,530, dated Oct. 10, 1961.

The assembly 1 comprises, among other things, a generally curved stationary structure provided with a discharge opening and an impeller 5 which is rotatable in the structure and provided with a plurality of circumferentially spaced abutments or blades 6 (one shown) for directing the product 2 against a knife 7 disposed adjacent the discharge opening. The knife is carried by a holder 8 which is firmly secured to an integral offset 9 formed on the structure. The structure is also provided with an integral offset 10 to which a member 11 is secured by a screw 12. The member 11 has an arcuate surface 13 which constitutes a continuation of an inner curved surface 14 of the structure.

As evidenced in FIGURE 6, the product 2 is shown as being partially cut by the knife 7 to form the portion 15, above referred to, and, as the portion is being severed from the product, knives generally designated 16 of the assembly 3 serves to cut the chip into the strips, pieces or segments 4. It is to be understood that the structure for slicing the product may be designed and constructed in various ways other than illustrated.

Referring now to the structural characteristics of the assembly 3 exemplified in FIGURES 1 through 5, and particularly to FIGURE 1, there is shown a pair of stationary supports 17 and 18 and a stationary rod or shaft 19, the latter of which has ends mounted on the supports. One of the ends of the shaft is fixedly secured to the support 17 by a key 20. The supports and shaft assist in mounting the assembly 3 in a correct operative relationship with respect to the assembly 1.

The assembly 3 comprises, among other things, a unit generally designated 21 which is mounted on the stationary shaft 19 for rotation through the agency of a pinion gear 22, which is operated by means of a drive gear and a power source (not shown).

The rotatable unit includes a pair of bearing blocks 23 and 24 which are respectively substantially housed in a pair of cylindrical enlargements or receiving means 25 and 26 formed integrally at the ends of a support or spool-like tubular member 100 through which the shaft 19 extends. The right enlargement 26 has a radial wall 27 provided with a plurality of circumferentially disposed apertures 28 and a cylindrical wall 29 having a thickened portion provided with a ring of spaced threaded apertures 30. A recessed cap 31 is secured to the enlargement 26 by a plurality of screws 32 which extend through the cap and connect with the threaded apertures 30. This cap is provided with a center aperture 31' through which the shaft 19 extends. The pinion gear 22 is mounted on a bushing 33 carried by the shaft and is connected to the cap by a plurality of screws 34 (one shown). The bearing block 24 is carried by a bushing 35 mounted on the shaft. It will be observed that the bushing 35 has the same axial length as that of the block and is held in place between the radial wall 27 of the enlargement and the end cap 31. The bushings serve to facilitate rotation of the pinion and the bearing block relative to the shaft. The block 24 is provided with a plurality of circumferentially spaced axially extending cylindrical openings 6 and with an annular recess 37 in its outer face.

A unique setup is provided whereby to supply a lubricant to the bushing 35. This setup comprises providing the right extremity of the stationary shaft 19 with an axial opening or passageway 38 and with an external annular groove 39 disposed at a location substantially midway the axial length of the bushing 35. A short passage 40 connects the interior of the passageway with the groove so a lubricant may be forced into the groove for dispersion between the shaft and bushing. The right extremity of the shaft 19 is also preferably provided with an internally threaded recess 41 communicating with the passageway 38 for accommodating a threaded portion of a conventional fitting 42 for initially receiving a lubricant under pressure. This system of lubrication has proven very efficient because the lubricant is sealed substantially within the confines of the enlargement 26 so that it cannot find its way externally of the assembly to contaminate a product being sliced or cut.

The knives 16 are identical in character and their right ends are preferably supported or carried by a plurality or set of cylindrical elements or holders 43 which are journalled in the openings 36 in the bearing block 24 and extend through the apertures 28 in the radial wall 27 of the enlargement 26. The outer ends of the elements extend into the annular recess 37, above referred to. The inner exposed ends of the elements are preferably notched to provide planar seats 46 for the knives and with threaded apertures. Screws 47 extend through apertures 48 provided in the knives and connect with the threaded apertures in the elements for detachably and firmly securing the right ends of the knives to the elements.

Referring more specifically to the knife structure, each knife preferably comprises a blade portion 49 and an offset 50, the latter of which is preferably disposed in an acute angular relationship to the blade portion. One side of the blade portion is bevelled to provide a planar bearing surface 51 which converges toward an opposite planar surface 52 to define a tapered cutting edge 53.

The means employed for supporting the opposite ends of the knives 16 will now be described. As stated above, the bearing block 23 is housed in the enlargement 25 of the tubular member 21. This block is provided with a plurality of circumferentially spaced axially extending openings 54 and the outer face of this block is preferably provided with an annular recess which is somewhat larger than the recess 37 provided in the block 24. The block 23 is mounted on a bushing 56 which is carried by the stationary shaft or rod 19. It will be observed that the axial length of the bushing and the block are substantially the same.

The enlargement 25 includes a cylindrical wall 57 which is thickened and provided with external threads 58 and with a radial wall 59 provided with a plurality of circumferentially spaced apertures 60. A plurality or set of cylindrical elements or holders 61 are journalled in the openings 54 and extend through the apertures 60 in the radial wall so that inner exposed extremities of the elements may be detachably connected to the opposite extremities of the elements may be detachably connected to the opposite extremities of the knives 16 by screws 62 which extend through the apertures 48 in the knives and threadedly connect with apertures provided therefor in the elements 61, as evidenced in FIGURES 1 and 3. The inner exposed extremities of the elements are also notched to provide planar seats for the knives. It will be observed that the axes of all of the cylindrical elements 43 and 61 and the knives 16 are axially aligned and are disposed in spaced parallel relationship as well as in external concentric spaced relationship with respect to the tubular member 100.

Each of the cylindrical elements 61 as depicted in FIGURES 1, 3 and 5, is also provided with an integral substantially semicircular offset 64 which has a boss 65 from which a short shaft or pin 66 axially extends. The shaft 66 is disposed in an eccentric and parallel relationship to the longitudinal axis of the cylindrical element. A ball bearing assembly or unit 67 is preferably mounted on each of the pins. The offsets 64 are disposed in the annular recess 55 in the bearing block and serve to limit movement of the elements toward the right as shown in FIGURE 1.

A unique organization or setup is provided for imparting oscillatory motion or partial rotation to the knives 16 and the elements 43 and 61 about their axes while they are revolved about the longitudinal axis of the stationary shaft. The means employed for obtaining this motion will now be described. An internally threaded cap 68 is connected to the threads 58 on the enlargement 25 and provided with a central aperture 69 through which the stationary shaft 19 extends. The enlargement 25, cap 68, block 23 and bushing 56 in combination define an annular space. Within this space there is a hub member 70 which is preferably fixed against rotation on the stationary shaft 19 through the agency of a cross pin 44 extending diametrically through the shaft 19 as shown in FIGURE 2. A cam member 71 is carried by the hub 70 and fixed thereon by a key 72. The member 71 is provided with a continuous cam groove or area 73 of a predetermined configuration which accommodates the ball bearing assemblies 67 as viewed in FIGURES 1 and 2. These bearing assemblies constitute cam followers. It is to be understood that, if found desirable, conventional rollers or other forms of cam followers may be utilized.

It will be observed that the left extremity of the stationary shaft 19 is preferably provided with a lubricating setup which substantially corresponds to the one above described. The shape and position of the fittings for this purpose is important because an operator can readily lubricate certain internal movable components in the tubular spool-like member 100 without removing the components. A nontoxic lubricant, approved for ball and roller bearings, may be used. In practice, it is desirable that each fitting receive a small amount of lubricant every two hours while the machine is operating.

Attention is directed to the important fact that the structural operative relationship between the elements 61 and the cam structure serves to provide an efficient means for oscillating the knives about their individual axes while the unit 21, comprised of the tubular member 100, caps 31 and 68, elements 43 and 61, and knives 16, is rotated about the axis of the stationary shaft 19 through the agency of the pinion gear 22 by a drive gear connected to a source of power (not shown). More specifically, and as exemplified in FIGURE 6, the organization is preferably such that the knives 16 will be successively automatically positioned in a predetermined substantially vertical depending or perpendicular relationship to the portion 15 or partial slice as it is being removed from the product. Otherwise expressed, the knives successively cut the portion 15 being removed from the product at substantially right angles to its path of movement so that the sides of the cut strips 4 will be parallel and perpendicular to the upper and lower surfaces of the portion. With this setup, the cross-sectional configuration of the strips will be substantially square.

As further illustrated in FIGURE 6, the strips are conveyed horizontally on an upper surface of the knife holder 8 and the strips may be cut to predetermined lengths by a pair of spaced rotatable disc-like knives 46 (one shown), or their full lengths. Also, the strips may be diced to size by utilizing a greater number of knives. It will be observed that the peripheral edges of the knives extend into notches or recesses provided in the upper surface of the knife holder 8 in order to insure that the rotatable disc-like knives will cut completely through the strips.

In view of the foregoing, it will be manifest that improved means have been provided whereby to impart oscillation or partial rotation to the knives and that improved means are provided whereby to conduct a lubricant to certain of the concealed movable components.

More particularly, the assembly shown in our Patent No. 3,003,530 requires that the knives and elements supporting them revolve about their respective axes as well as about a common axis. This principle of operation requires the knives to turn past each other at two points during each revolution of the assembly. The result is a physical limitation on the number of knives which can be mounted without sacrificing knife strength through size reduction. By utilizing the subject invention, the number of knives may be increased in order to obtain finer cuts or a resultant product which is of a smaller cross-sectional configuration than the one obtained in the patented structures. The improvement also has advantages with respect to minimizing wear on the components and utilizing blades of increased strength.

Having thus described our invention, it is obvious that various modifications may be made in the same without departing from the spirit of the invention and, therefore, we do not wish to be understood as limiting ourselves to the exact form, construction, arrangements, and combinations of parts herein shown and described.

We claim:

1. An assembly of the character described, comprising a shaft adapted for supporting the assembly in a stationary position, an elongate tubular member having cylindrical enlargements at its ends, a pair of bearing blocks respectively disposed in said enlargements, each of said blocks being provided with a plurality of circumferentially spaced openings and each of said enlargements being provided with a plurality of circumferentially spaced apertures aligned with the openings, sets of elongate elements respectively extending through the openings and apertures in the blocks and enlargements, elongate knives having ends respectively connected to said sets of elements for locating the knives in a generally concentric relationship with respect to the axis of said shaft, a stationary member provided with a continuous cam surface, means providing continuously engaged operative connections between the elements of one set and said cam surface, and means for driving said tubular member, blocks, elements and knives about the axis of said shaft and imparting successively corresponding partial rotation to said elements and said knives about their respective axes through the agency of said operative connections.

2. An assembly comprising a shaft adapted for support in a stationary position, an elongate tubular member, a pair of bearing blocks respectively connected to opposite extremities of said tubular member, each of said blocks being provided with a plurality of circumferentially spaced openings, a set of elongate elements respectively journalled in the openings of each block, elongate knives having ends respectively connected to the sets of said elements, a stationary member provided with a continuous cam surface, and means providing continuously engaged eccentric operative connections between the elements of one set and said cam surface, and means for driving said tubular member, blocks, elements and knives as a unit about the axis of said shaft so that said cam surface will successively impart corresponding partial rotation to said elements and knives about their axes.

3. An assembly of the character described comprising stationary supporting means, a cam member fixed on said supporting means, an elongate tubular support rotatably mounted on said supporting means, a pair of bearing blocks respectively carried by oppositely extremities of said tubular support, a first set of elements journalled in one of said blocks and a second set of elements journalled in the other of said blocks, a plurality of elongate knives having ends respectively supported by said sets of elements, and means carried by one set of elements continuously operatively connected to said cam member in a manner whereby said elements and said knives will be caused to successively correspondingly oscillate about their respective axes when said tubular support, blocks, elements and knives are revolved as a unit about the longitudinal axis of said supporting means.

4. The assembly defined in claim 3, in which said means operatively connecting said second set of elements with said cam member includes eccentrically mounted bearings carried by said one set of elements, and said cam member is provided with a continuous cam groove in which said bearings ride.

5. The assembly defined in claim 3, in which said supporting means is in the form of an elongate shaft and at least one end of said shaft is provided: a longitudinal opening, an annular grove inset from said end, and a passage communicatively connecting said longitudinal opening and said groove in such a manner that a lubricant fed to said opening may be caused to flow to said groove for dispersion about said shaft to facilitate rotation of one of said bearing blocks on said shaft.

6. In combination: a stationary shaft, an elongate tubular support surrounding said shaft, a pair of bearing blocks respectively fixed on opposite ends of said support and rotatably mounting the latter on said shaft, first and second sets of elements respectively journalled on said blocks, elongate knives having ends secured to said elements for locating said knives in a circumferentially spaced concentric relation to said support, a cam member fixedly secured to said shaft in juxtaposed relation to said first set of elements and having a continuous cam surface, means continuously operatively connecting said first set of elements and said cam surface in a manner whereby to successively impart corresponding oscillatory motion to said knives, when said support, bearing blocks, elements and knives are rotated as a unit about the longitudinal axis of said shaft.

7. In combination: an elongate stationary shaft, means for supporting opposite extremities of said shaft, tubular means surrounding said shaft, means concealed in said tubular means and being rotatable on said shaft at a location inset from one end thereof, and means whereby said rotatable means may be readily lubricated, said last-mentioned means comprising: an axial opening provided in said shaft, an external groove provided on said shaft located between its longitudinal axis and said rotatable means, a passage communicatively connecting said opening and said groove, and a fitting threadedly connected to said shaft for receiving a lubricant for transmission to said groove via said opening and passage for confinement in said tubular means.

8. An elongate element adapted for movement in a support, said element having an elongate cylindrical portion, one end of said portion being provided with means for attaching one end of a knife thereto, an opposite end of said portion being provided with an integral offset having a curved surface located at one side of the longitudinal axis of said portion for engaging a driving member, and a shaft integral with said offset extending axially outwardly therefrom in parallel relation to said cylindrical axis, and rotatable bearing means carried by said shaft.

References Cited

UNITED STATES PATENTS

| | | | |
|---|---|---|---|
| 1,641,103 | 8/1927 | Small | 145—4.2 X |
| 2,842,355 | 7/1958 | Lang. | |
| 3,003,530 | 10/1961 | Urschel et al. | 146—78 |
| 3,141,432 | 7/1964 | Reeber et al. | 74—54 X |
| 3,122,341 | 2/1964 | Le Bus et al. | 242—157.1 |
| 3,315,540 | 4/1967 | Baumgartner | 74—545 X |

W. GRAYDON ABERCROMBIE, *Primary Examiner.*